US012806628B2

(12) United States Patent
Reznitchenko

(10) Patent No.: US 12,806,628 B2
(45) Date of Patent: Nov. 24, 2026

(54) ROLLER CRUSHER, A METHOD FOR MONITORING PHYSICAL CONDITIONS THEREOF, AND A REFITTING KIT

(71) Applicant: METSO USA INC., Brookfield, WI (US)

(72) Inventor: Vadim Reznitchenko, Mechanicsburg, PA (US)

(73) Assignee: Metso USA Inc., Brookfield, WI (US)

( * ) Notice: Subject to any disclaimer, the term of this patent is extended or adjusted under 35 U.S.C. 154(b) by 140 days.

(21) Appl. No.: 19/052,763

(22) Filed: Feb. 13, 2025

(65) Prior Publication Data

US 2025/0177995 A1 Jun. 5, 2025

Related U.S. Application Data

(62) Division of application No. 18/479,151, filed on Oct. 2, 2023, now Pat. No. 12,251,707, which is a division of application No. 17/345,073, filed on Jun. 11, 2021, now Pat. No. 11,801,516.

(51) Int. Cl.

| | |
|---|---|
| ***B02C 25/00*** | (2006.01) |
| ***B02C 4/02*** | (2006.01) |
| ***B02C 4/28*** | (2006.01) |
| ***B02C 4/32*** | (2006.01) |

(52) U.S. Cl.
CPC ................ *B02C 25/00* (2013.01); *B02C 4/02* (2013.01); *B02C 4/28* (2013.01); *B02C 4/32* (2013.01)

(58) Field of Classification Search
CPC .. B02C 25/00; B02C 4/00; B02C 4/32; B02C 4/28
See application file for complete search history.

(56) References Cited

U.S. PATENT DOCUMENTS

| | | | | |
|---|---|---|---|---|
| 7,628,347 B2 * | 12/2009 | Frangenberg | B02C 4/28 | 241/285.2 |
| 2008/0217451 A1 * | 9/2008 | Frangenberg | B30B 3/04 | 241/227 |
| 2010/0186607 A1 * | 7/2010 | Horster | B02C 4/28 | 100/176 |
| 2013/0277467 A1 * | 10/2013 | Niklewski | B02C 4/32 | 241/25 |
| 2014/0048634 A1 * | 2/2014 | Brendler | B30B 3/04 | 241/230 |

FOREIGN PATENT DOCUMENTS

| | | | |
|---|---|---|---|
| WO | WO-2019093956 A1 * | 5/2019 | B02C 4/02 |

* cited by examiner

*Primary Examiner* — Bobby Yeonjin Kim
(74) *Attorney, Agent, or Firm* — Andrus Intellectual Property Law, LLP

(57) ABSTRACT

A roller crusher that includes a frame, first and second crusher rolls arranged axially in parallel with each other and a deflection distributor. The roller crusher further includes at least one load sensor configured to detect a material load in the deflection distributor and at least one positioning sensor configured to detect a parameter pertaining to a distance between a first point and a second point of the roller crusher. At least the first point is defined on the deflection distributor or on one of movable bearing housings of the roller crusher. A method for monitoring the physical condition of the deflection distributor and a refitting kit for a roller crusher are further disclosed.

11 Claims, 8 Drawing Sheets

ROLLER CRUSHER, A METHOD FOR MONITORING PHYSICAL CONDITIONS THEREOF, AND A REFITTING KIT

CROSS REFERENCE TO RELATED APPLICATION

The present application is a divisional application of U.S. patent application Ser. No. 18/479,151, filed Oct. 2, 2023, which has now issued as U.S. Pat. No. 12,251,707, which is a divisional application of U.S. patent application Ser. No. 17/345,073, filed Jun. 11, 2021, which has now issued as U.S. Pat. No. 11,801,516, the disclosures of which are incorporated herein by reference.

FIELD OF THE INVENTION

The present disclosure relates to a roller crusher and a method for monitoring the physical condition of a deflection distributor of said roller crusher. The disclosure further relates to a refitting kit for a roller crusher.

BACKGROUND ART

When crushing or grinding rock, ore, cement clinker and other hard materials, roller crushers may be used having two generally parallel rolls which rotate in opposite directions, towards each other, and which are separated by a gap. The material to be crushed is then fed into the gap. One type of roller crusher is called high pressure grinding rollers or high pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases could be achieved. This crushing technique is called interparticle crushing. Here, the material to be crushed or pulverized is crushed, not only by the crushing surfaces of the rolls, but also by particles in the material to be crushed, hence the name interparticle crushing. When performing interparticle crushing, the roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained. Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In this type of roller crusher, the gap width is created by the pressure of the feed material's characteristics. The movement of the crushing rolls away from each other is controlled with a hydraulic system comprising active hydraulic cylinders and accumulators, which accumulators provide a spring action to handle varied material feed characteristics. For example, a higher material feed-density to the roller crusher will normally cause a greater gap width than a lower material feeding-density would and uneven feed characteristics, such as non-uniform material feed distribution, along the length of the crusher rolls will cause the gap width to differ along the length of the crusher rolls, i.e. creating a skew. Such uneven feed characteristics may be caused by uneven feed of the amount of material along the length of the crusher rolls, but may also be caused by different bulk density within the feed material, varying particle size distribution within the feed material, varying moisture content within the feed, and diversity of mineral breaking strength in material feed, but also by uncrushable material, which may enter into the feed material. There have been attempts made to avoid this skewing problem, but these attempts have typically resulted in complicated systems. Recently, a mechanical deflection distributor system was proposed in WO2019093956 A1 to overcome this problem. The deflection distributor mechanically links the left and right side of the movable grind roller so as to strive skewing to a minimum. The heavy forces involved during crushing is however putting severe stress to all mechanical parts of roller crusher, resulting in wear and potentially also increased material weakness with time. There is thus a need in the art for improvements.

SUMMARY

It is an object to mitigate, alleviate or eliminate one or more of the above-identified deficiencies in the art and disadvantages singly or in any combination and solve at least the above-mentioned problem.

According to a first aspect there is provided a roller crusher, said roller crusher comprising; a frame; first and second crusher rolls arranged axially in parallel with each other, said first crusher roll being supported in bearing housings which are arranged in the frame, said second crusher roll being supported in bearing housings which are configured to be movable; and an active hydraulic system configured to adjust the position of the second crusher roll and a crushing pressure between the two crusher rolls, wherein the roller crusher further comprises a deflection distributor, wherein said deflection distributor comprises a deflection distributing shaft, mounts for attaching said deflection distributing shaft at said frame of said roller crusher and thrust rods each having first and second ends, wherein a first end of each of said thrust rods is attached to said deflection distributing shaft via a lever, and wherein a second end of each of said thrust rods is attached to a movable bearing housing of said second crusher roll, characterized in that the roller crusher further comprises:

- at least one load sensor configured to detect material load in the deflection distributor; and
- at least one positioning sensor configured to detect a parameter pertaining to a distance between a first point and a second point of the roller crusher wherein at least the first point is defined on the deflection distributor or on one of the movable bearing housings.

The roller crusher may be advantageous over the prior art in that it allows to monitor the physical condition of the deflection distributor. Monitoring may be carried out during maintenance and/or other periods of down time but may alternatively be performed during crushing operation. By means of the at least one positioning sensor and the at least one load sensor, it is possible to monitor both the physical conditions of the mechanical links of the system by measuring or at least estimating the joint clearance. Joint clearance occurs as a result of wear to mechanical elements and systems used to link mechanical elements, e.g. bearings, bushings or the like, and may with time give rise to a mechanical hysteresis in the deflection distributor. Such hysteresis is unwanted as it reduces the effectiveness of the anti-skewing properties of the deflection device. In short, if joint clearance is too high, the deflection distributor may not operate as intended. Another kind of wear is material fatigue. This may occur due to the high internal loads which the mechanical elements of the deflection distributor are subjected to during operation. Material fatigue is also unwanted as it effectively reduces the rigidity of the deflection distributor and therefore reduces the effectiveness of its anti-skewing properties. By utilizing both at least one position sensor and at least one load sensor, both the physical properties of the mechanical joints (joint clearance) and the physical properties of the material properties (material rigidity/degree of material fatigue) may be measured, estimated and/or monitored.

According to some embodiments, the at least one load sensor comprises a plurality of load sensors and the at least one positioning sensor comprises a plurality of positioning sensors.

Using more than one sensor of each kind allows for improving reliability and accuracy of the physical condition monitoring by providing data from several target points/areas of the deflection distributor. Moreover, it allows for selectively determining the joint clearance and/or material load at specific target points/areas, allowing e.g. to identify a faulty bearing or a faulty element.

According to some embodiments, the roller crusher further comprises a control unit configured to determine, based at least on input from the at least one positioning sensor, a degree of joint clearance in the deflection distributor indicative of material wear.

According to some embodiments, the control unit is further configured to determine, based on input from the at least one load sensor and the at least one positioning sensor, a degree of rigidity in the deflection distributor indicative of material fatigue.

The term "load sensor" should be construed as any kind of sensor capable of detecting parameters related to material load. Such load sensors may comprise a load cell or force transducer. Such load cells may include, but are not limited to, hydraulic, pneumatic, piezoelectric and strain gauge load cells. The load cell may convert a force such as tension, compression, pressure, or torque into an electrical signal that can be measured and standardized. As the force applied to the load cell increases, the electrical signal changes proportionally.

According to some embodiments, at least one of the at least one load sensor is a load sensor pin.

The term "positioning sensor" should be construed as a sensor that facilitates measurement of mechanical position. A position sensor may indicate absolute position (location) or relative position (displacement), in terms of linear travel, rotational angle, or three-dimensional space. Common types of position sensors include, but are not limited to: capacitive displacement sensors, Eddy-current sensors, Hall effect sensors, Inductive sensors, Piezo-electric transducer (piezo-electric), Proximity sensors (optical) string potentiometers (also known as string pot., string encoder, cable position transducer) and ultrasonic sensors.

According to some embodiments, at least one of the at least one positioning sensor is a linear positioning sensor. Such linear positioning sensors may e.g. be based on the working principle of a linear transducer converting an objects linear motion into electrical signals. The linear positioning sensor may be a rod based sensor including a sensor housing in which a sensor rod is slidably arranged. A so-called LVDT, Linear Variable Differential Transformer, could be used to determine the relative position between different points on the roller crusher. The location of the sensors may vary. For example, a sensor can be integrated into machine parts such as links, pins and cylinders or it may be attached to an outside of a machine part.

According to some embodiments, the at least one positioning sensor comprises a first and a second positioning sensor arranged at opposite ends of the second crusher roll such that each of the first and second positioning sensor has its respective first point defined on a respective movable bearing housing, and its respective second point defined on the frame.

This may be advantageous as it allows determining the positions of the end points defined by the entire mechanical linkage which makes up the deflection distributor. Determining the positions of said end points in relation to each other allows for determining, or estimating, the overall, or total, joint clearance of the deflection distributor.

According to some embodiments, the at least one load sensor comprises two load sensors each arranged at a respective joint between a first end of each of said thrust rods and a respective lever of the deflection distributing shaft. The load sensor may be arranged inside a bearing which interconnects said thrust rods and a respective lever to form the joint.

This may be advantageous as it allows obtaining a load reading which accurately reflects to overall load in the deflection distributor. At this position, one advantage is that the load sensor is arranged such that it is in line with the force vector of the actual load acting on the deflection distributor. By providing one load sensor in each lateral end of the deflection distributor, it is possible to monitor any non-uniformities in measured load.

According to some embodiments, at least one of the at least one load sensor and at least one of the at least one positioning sensor are arranged on the deflection distributing shaft and configured to detect a torsional load and an angle of twist, respectively.

This may be advantageous as it allows monitoring the physical conditions of the deflector distributor shaft individually. With time, high twisting loads may cause a reduction in material rigidity indicative of material fatigue. By measuring the torsional load as well as the angle of twist, material fatigue could be monitored.

According to some embodiments, at least one of the at least one load sensor and at least one of the at least one positioning sensor are arranged on each of the thrust rods and configured to detect an axial load and a linear distance, respectively.

This may be advantageous as it allows monitoring the physical conditions of the thrust rods individually. With time, high tensile and compressive loads may cause a reduction in material rigidity in the thrust rods indicative of material fatigue. By measuring the axial load as well as the linear distance, material fatigue in the thrust rods could be monitored.

According to some embodiments, at least one of the at least one positioning sensor is arranged on the deflection distributor such that its first point is defined on the deflection distributing shaft and its second point is defined on one of the thrust rods.

This may be advantageous as it allows monitoring the physical conditions of the joints which connect the deflection distributor shaft and each of the thrust rods. The joint may be defined by a bearing. In such a case, the proposed embodiment allows for determining any joint clearance resulting from wear or malfunction of said bearing.

According to a second aspect there is provided a method for monitoring the physical condition of a deflection distributor of a roller crusher,

- wherein said deflection distributor comprises a deflection distributing shaft, thrust rods each having first and second ends and mounts for attachment of said deflection distributing shaft at a first and a second side of a frame of said roller crusher, wherein a first end of each of said thrust rods is attached to said deflection distributing shaft via a lever, wherein a second end of each of said thrust rods is attached to a movable bearing housing of said roller crusher, at least one load sensor configured to detect material load in the deflection distributor, and at least one positioning sensor configured to detect a parameter pertaining to a distance between a first point and a second point of the roller crusher, wherein at least the first point is defined on the deflection distributor or on one of the movable bearing housings, said method comprising:
- displacing the movable bearing housings with respect to each other such that the deflection distributor is moved from a first identified rigid state at which joint clearance does not affect the deflection distributor, via an intermediate state at which joint clearance affect the deflection distributor, to a second identified rigid state at which joint clearance does not affect the deflection distributor;
- determining, based on output from the at least one positioning sensor obtained at the first and the second rigid states, respectively, a displacement distance indicative of a degree of joint clearance in the deflection distributor.

The method may be advantageous as it allows determining, or estimating, a degree of joint clearance of parts of, or the whole, deflection distributor. As understood by the person skilled in the art, the determined degree of joint clearance will depend on the exact position of the at least one positioning sensor. Only one positioning sensor is needed to carry out the method. As a non-limiting example of such a one-sensor approach, the roller crusher may comprise only one positioning sensor arranged at one end of the second crusher roll such that the only one positioning sensor has its first point defined on the movable bearing housing and its second point defined on the frame. The method may then be performed by displacing the movable bearing housing which position is measured by the only one positioning sensor while keeping the opposite movable bearing housing locked in relation to the crusher frame. The output from the only one positioning sensor will then reflect a total joint clearance of the deflection distributor. If, alternatively, or additionally, a positioning sensor is arranged somewhere between the end points of the mechanical linkage, such as e.g. on the deflection distributor such that its first point is defined on the deflection distributing shaft and its second point is defined on one of the thrust rods, only parts of the total joint clearance will be detected.

The term "rigid state" should be construed as a state of the deflection distributor at which the elements defining the mechanical linkage is positioned with respect to each other such that each element abuts adjacent elements rigidly. Thus, at such a rigid state, any joint clearance in the mechanical linkage will not affect the linkage. A rigid state may be defined at an end point of the overall, or total, joint clearance of the deflection distributor, but may alternatively be defined even further out from such an end point.

The term "intermediate state" should be construed as a state located in between rigid states at which joint clearance do affect the deflection distributor. This implies that the intermediate state is located within the range defined between the first and the second rigid states, i.e. the range which defines the overall, or total, clearance, and that the mechanical linkage of the deflection distributor, when the deflection distributor is in the intermediate range, will be affected by joint clearance.

It should be understood that a rigid state of a real deflection distributor of a roller crusher is defined when the rotational axis of the second crusher roll forms a non-zero angle with respect to the rotational axis of the first crusher roll. In other words, at such a rigid state, the second crusher roll will be skewed with respect to the first crusher roll. The non-zero angle is a result from overall joint clearance in the deflection distributor and the angle increases with increasing overall joint clearance. In an ideal deflection distributor, where joint clearance is zero, the first and second rigid states will overlap each other and the rotational axis of the second crusher roll will be parallel to the rotational axis of the first crusher roll at all times.

The method may be performed when the roller crusher is not in operation, e.g. in the form of a predefined test routine. One way of performing the method could be to let the active hydraulic system of the roller crusher adjust the position of the two opposite bearing housings which supports the second crusher roll independently from each other, thus in other words actively skew the second crusher roll with respect to its intended operating position.

The method may, alternatively, be performed online during operation of the roller crusher. In such a case, the movable bearing housings will instead be displaced in relation to each other by the forces naturally occurring in the roller crusher as a result from the crushing process, e.g. when too hard or even uncrushable objects pass through the crusher gap at an off center position of the crusher gap (tramp events).

According to some embodiments, said first and second rigid states of the deflection distributor are identified based on output from the at least one load sensor.

This way of identifying that the deflection distributor has reached a rigid state may have certain advantages, especially when the method is performed during operation of the crusher. Displacement of the movable bearing housings with respect to each other between the first and second rigid state does typically not require much force, especially not if performed by the hydraulic system when not operating the roller crusher. The applied force needs to overcome the friction in the system, but apart from that, the deflection distributor will, because of joint clearance, not provide a counterforce. As a rigid state is reached, however, any attempt to displace the movable bearing housings with respect to each other even further, would require a substantial force to overcome the counterforce subjected to the movable bearing housings from the deflection distributor. Thus, the output from the at least one load sensor will go from a low value at the range defined between the first and second rigid states, to high values beyond that.

The first and second rigid states of the deflection distributor could be identified by detecting a load using the at least one load sensor, comparing the detected load to a load threshold value, and identify the first and/or the second rigid state as the state of the deflection distributor at which the determined load is found to exceed a load threshold value.

The load threshold value may be set to a level which at least exceeds the internal load expected in the deflection distributor as a result from e.g. the frictional forces.

An alternative way of identifying that the deflection distributor has reached a rigid state is to determine the load in the hydraulic system, e.g. by monitoring the hydraulic oil pressure, and base the identification of a rigid state on a variation in said load. This may be especially advantageous when performing the method by using the hydraulic system when the crusher is not in operation, as explained hereinabove.

According to some embodiments, the method further comprises:

further displacing, by applying an external load to the deflection distributor, the movable bearing housings with respect to each other such that the deflection distributor is moved to a third rigid state located outside of a range defined between the first and the second rigid states;

determining, based on output from the at least one load sensor, a load in the deflection distributor and, based on output from the at least one positioning sensor, a further displacement distance, wherein said determined load and said determined further displacement distance together defines a determined load-distance pair which is indicative of a degree of rigidity in the deflection distributor.

This embodiment of the method may be advantageous as it provides not only a measure of the joint clearance, but also a measure of the rigidity of the system. The method may be performed online when the crusher is in operation as well as when the crusher is not in operation e.g. in the form of a dedicated test routine.

According to the embodiment, the determined load-distance pair is indicative of a degree of rigidity in the deflection distributor. This implies that it is possible to monitor only one load-distance pair located outside of the range defined between the first and the second rigid states in order to monitor the rigidity of the deflection distributor. The rigidity of the deflection distributor will affect the degree of displacement as function of load. One approach to estimate a degree of rigidity based on one load-distance pair only, is to form a ratio between the determined load and the determined further displacement distance. This ratio will then show a decrease with decreasing rigidity.

According to some embodiments, the method further comprises comparing a ratio between said determined load and said determined further displacement distance with a reference ratio, and outputting a rigidity alert signal in response to said ratio deviating from the reference ratio by more than a threshold ratio value.

The degree of rigidity may alternatively be expressed in the terms of a load-distance function. The method may comprise determining a load-distance function based on said load-distance pair determined at the third rigid state, and the distance value determined at the second rigid state at which the load is zero or close to zero.

According to some embodiments, the method further comprises:

varying the applied external load to the deflection distributor such that the deflection distributor is moved between the third rigid state and the second rigid state;

repeating the step of determining a load-distance pair for one or more mutually different detected loads so as to provide two or more unique load-distance pairs;

determining a load-distance function based on the coordinates defined by the two or more unique load-distance pairs, wherein the load-distance function is indicative of a degree of rigidity in the deflection distributor.

This may be advantageous as it may allow determining the degree of rigidity with higher accuracy as a result from the larger data set. The load-distance function may be determined by fitting a predetermined analytical function, such as a linear function, to the two or more unique load-distance pairs. Alternatively, the load-distance function may be defined by the two or more unique load-distance pairs in themselves, in the form of a discrete function.

According to some embodiments, the method further comprises:

comparing said displacement distance with a predetermined displacement distance threshold value;

outputting a joint clearance alert signal in response to said displacement distance exceeding said displacement distance threshold value.

This allows for alerting personnel and/or control systems operatively connected to the roller crusher (such as the control unit of the roller crusher) that the degree of clearance has exceeded an allowed level.

According to some embodiments, the method further comprises:

comparing said determined load-distance function with a reference function;

outputting a rigidity alert signal in response to a slope of said determined load-distance function deviating from a slope of said reference function by more than a predetermined slope threshold value.

This allows for alerting personnel and/or control systems in operatively connected to the roller crusher (such as the control unit of the roller crusher) that the degree of rigidity has deviated beyond an allowed level.

According to a third aspect there is provided deflection distributor refitting kit for a roller crusher, the deflection distributor refitting kit comprising a deflection distributing shaft, thrust rods each having first and second ends and mounts for attachment of said deflection distributing shaft at a first and a second side of a frame of said roller crusher, wherein a first end of each of said thrust rods is attached to said deflection distributing shaft via a lever, and wherein a second end of each of said thrust rods is arranged to be attached to a movable bearing housing of said roller crusher, characterized in that the deflection distributor refitting kit further comprises:

at least one load sensor configured to detect material load in the deflection distributor refitting kit; and at least one positioning sensor configured, when mounted on the roller crusher, to detect a parameter pertaining to a distance between a first point and a second point of said roller crusher wherein at least the first point is defined on the deflection distributor refitting kit or on one of the movable bearing housings.

The deflection distributor refitting kit may be advantageous as it allows mounting on conventional roller crushers which do not have deflection distributors. The refitting kit may further comprise a control unit configured to determine, based at least on input from the at least one positioning sensor, a degree of joint clearance in the deflection distributor indicative of material wear. The control unit may be further configured to determine, based on input from the at least one load sensor and the at least one positioning sensor, a degree of rigidity in the deflection distributor indicative of material fatigue.

According to some embodiments, the at least one positioning sensor comprises a first positioning sensor configured to be mounted on the first side of the frame and a second positioning sensor configured to be mounted on the second side of the frame such that each of the first and second positioning sensors has its respective first point defined on a respective movable bearing housing, and its respective second point defined on the frame.

According to some embodiments, the at least one load sensor comprises two load sensors each arranged at a respective joint between a first end of each of said thrust rods and a respective lever of the deflection distributing shaft.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The invention will by way of example be described in more detail with reference to the appended drawings, which shows presently preferred embodiments of the invention.

Figure 1:
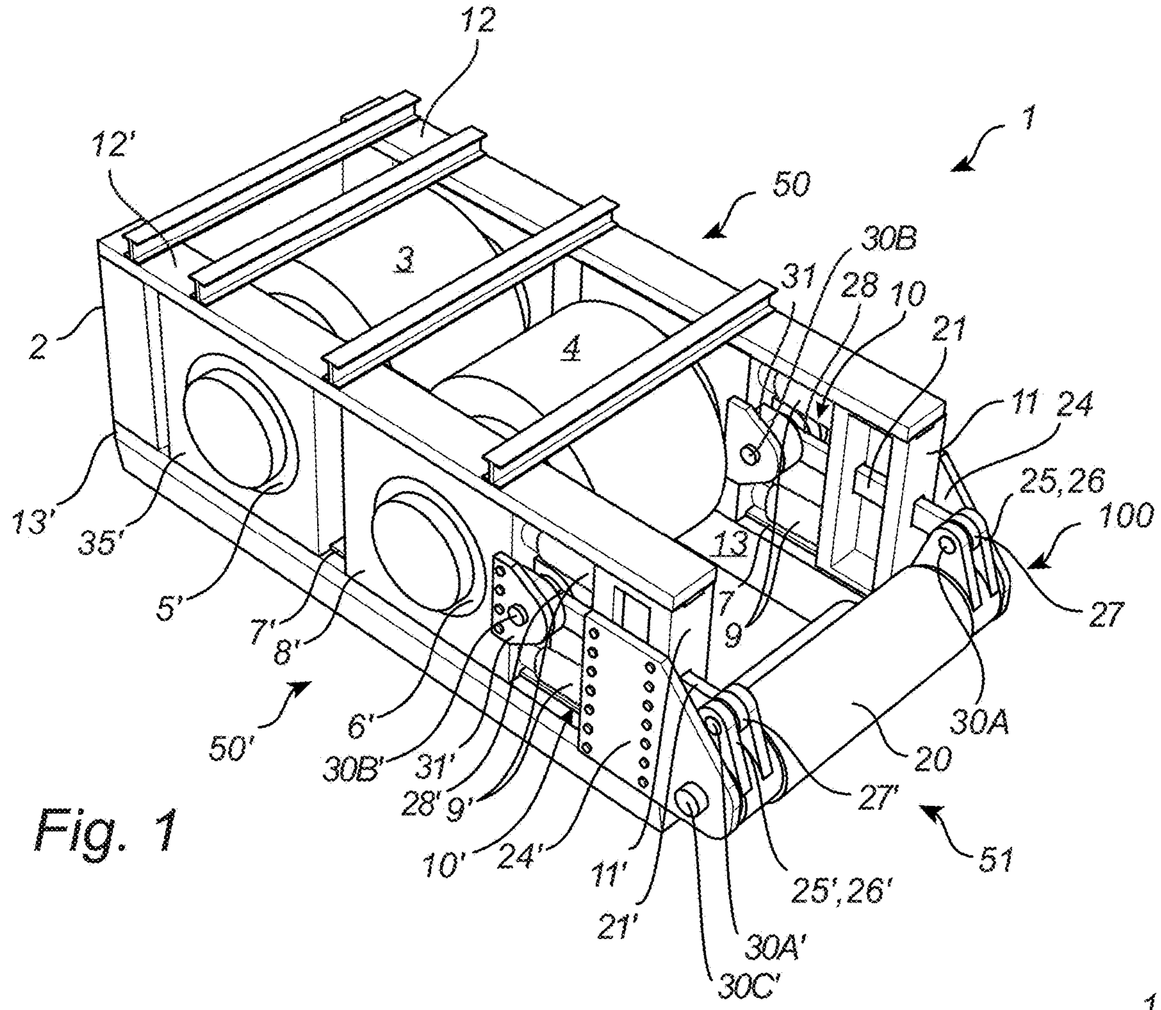
FIG. 1 shows a perspective view of a roller crusher according to an embodiment of the present disclosure.
Figure 3A:
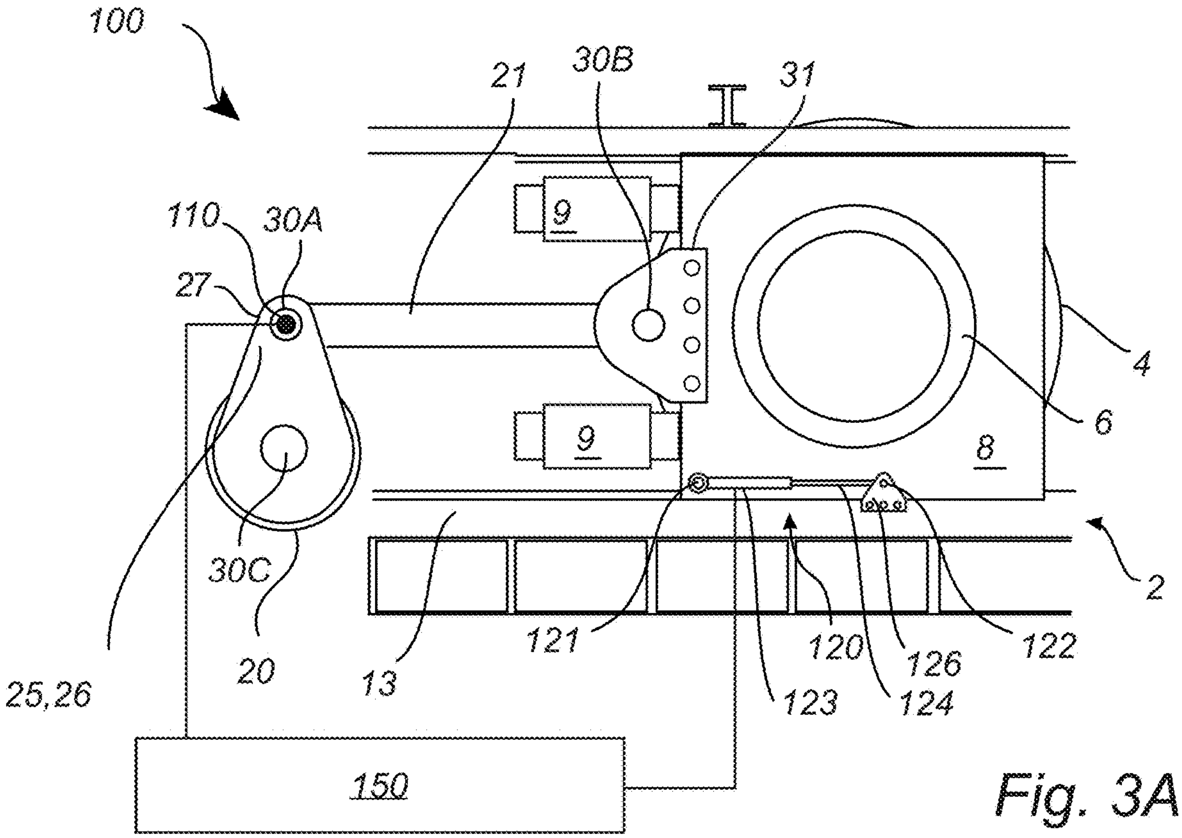

FIG. 3A and B shows opposite side views of parts of the roller crusher of FIG. 1.

FIG. 4A-E show top views of the deflection distributor and the two crusher rolls for different predefined states of the deflection distributor.

Figure 5:
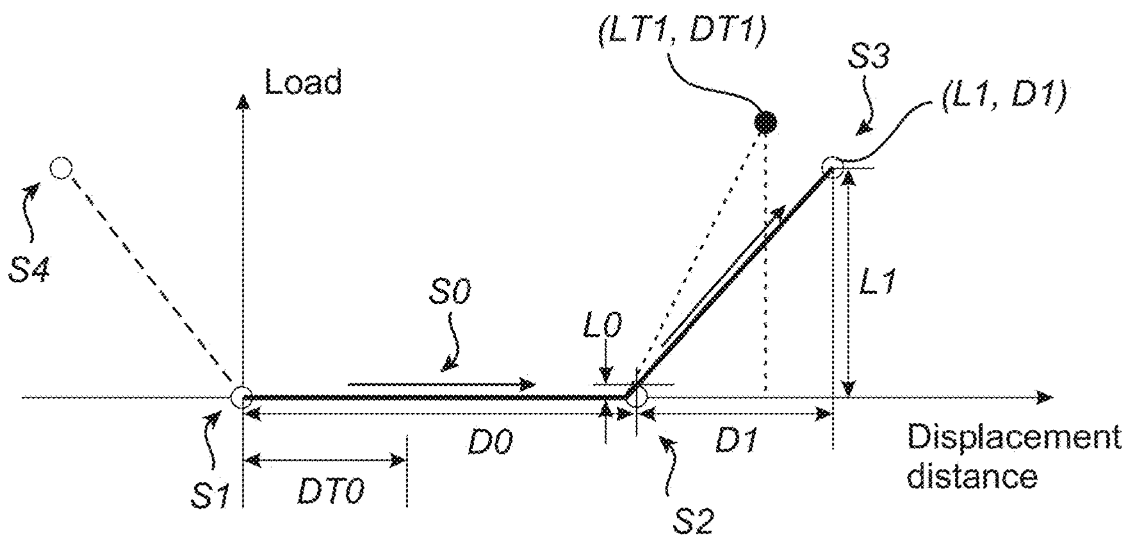

FIG. 5 illustrates the displacement of the deflection distributor when performing a method according to a first embodiment.

Figure 6:
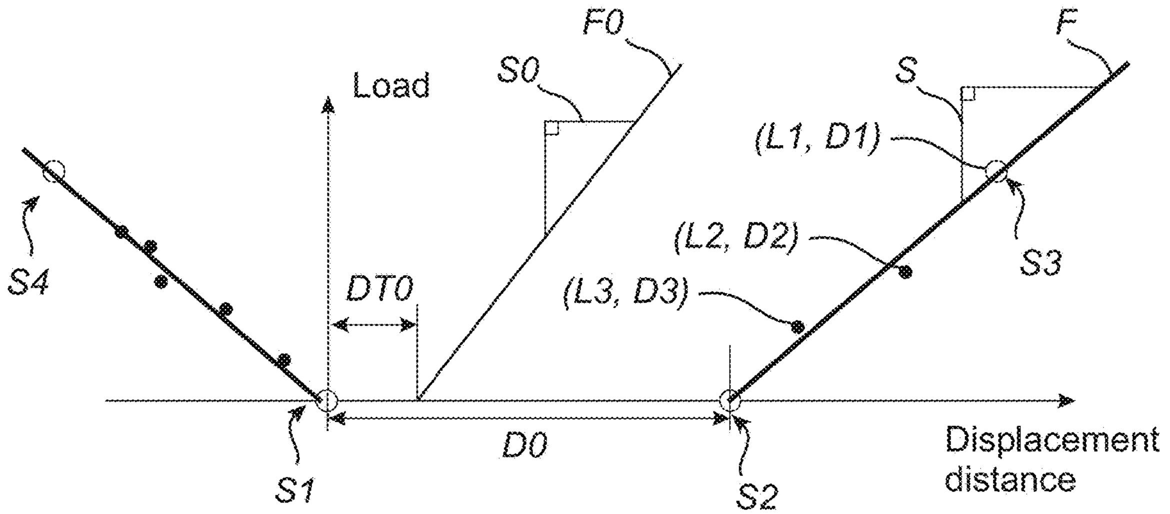

FIG. 6 illustrates the displacement of the deflection distributor when performing a method according a second embodiment.

Figure 7:
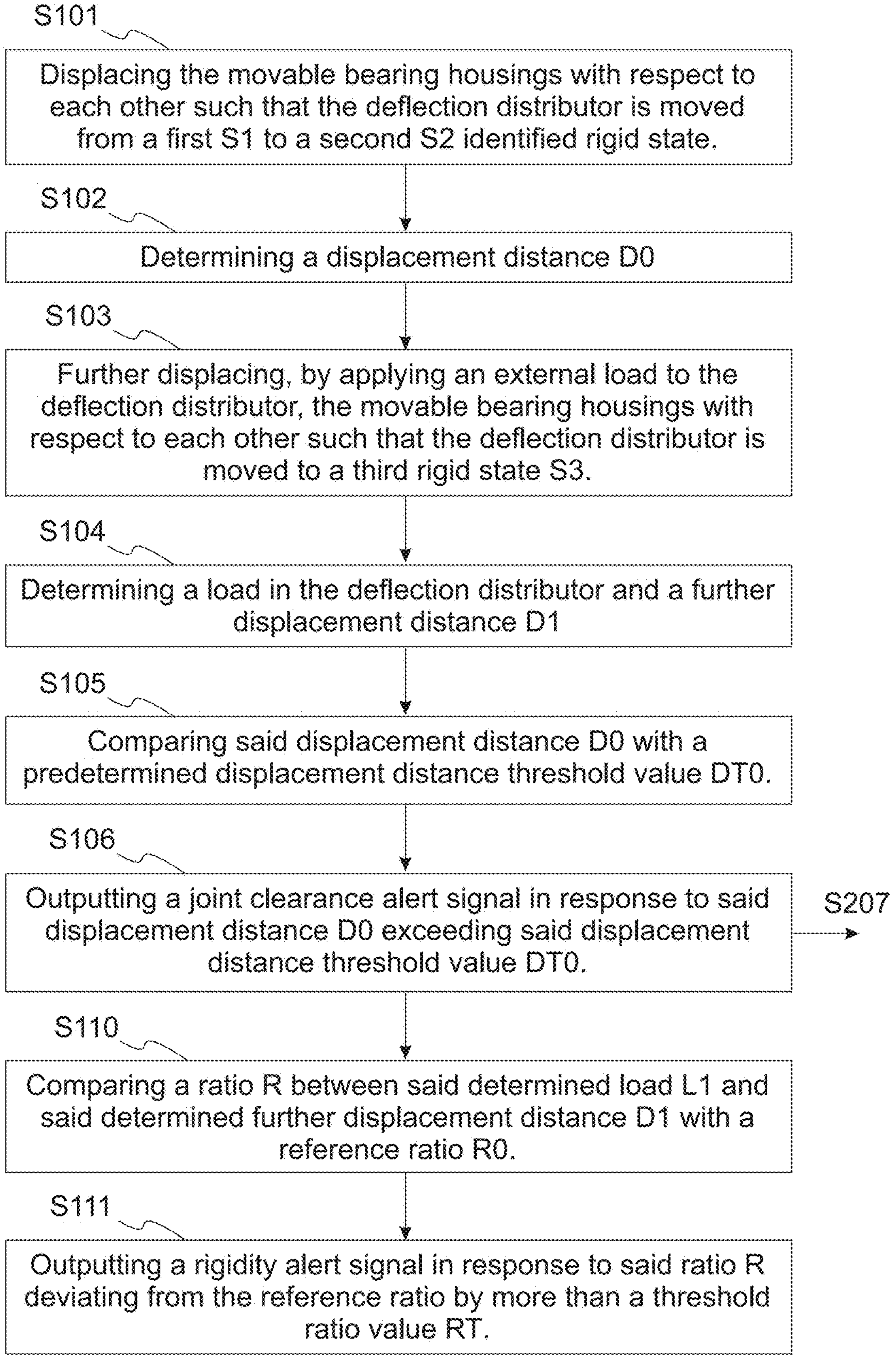

FIG. 7 is a flow chart of the method according to the first embodiment.

Figure 8:
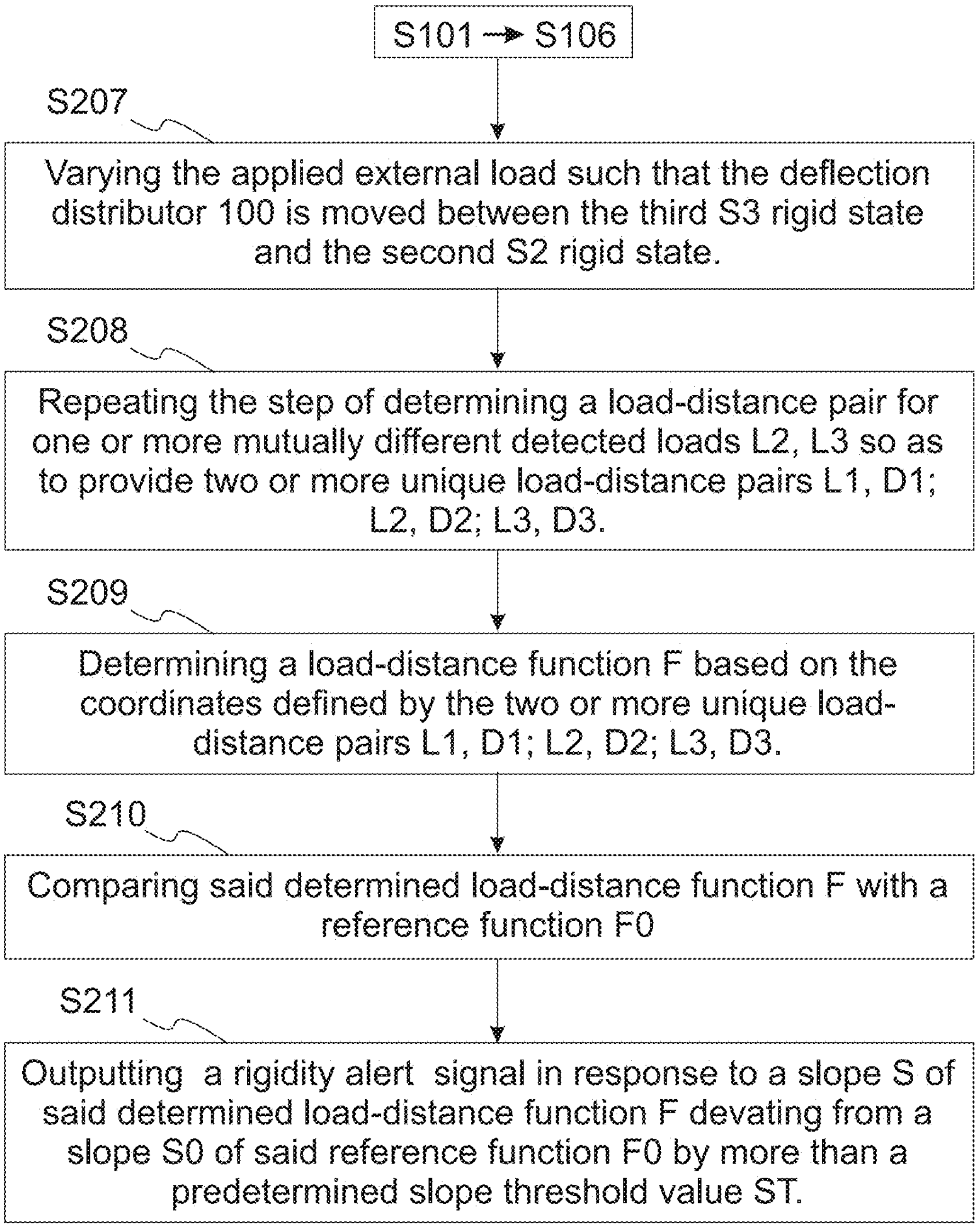

FIG. 8 is a flow chart of the method according to the second embodiment.

Figure 9:
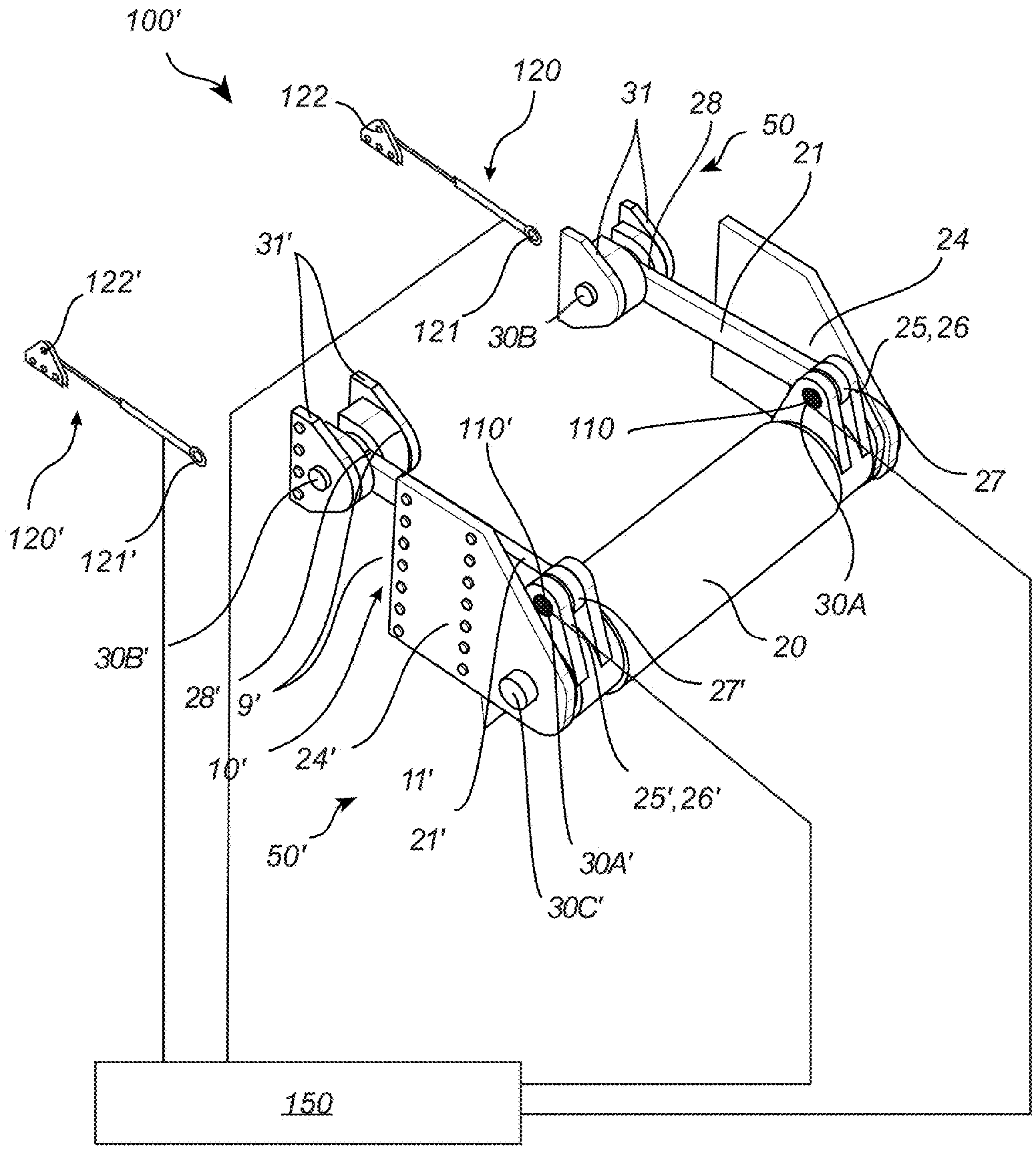

FIG. 9 is perspective view of a deflection distributor refitting kit according to an embodiment.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 2:
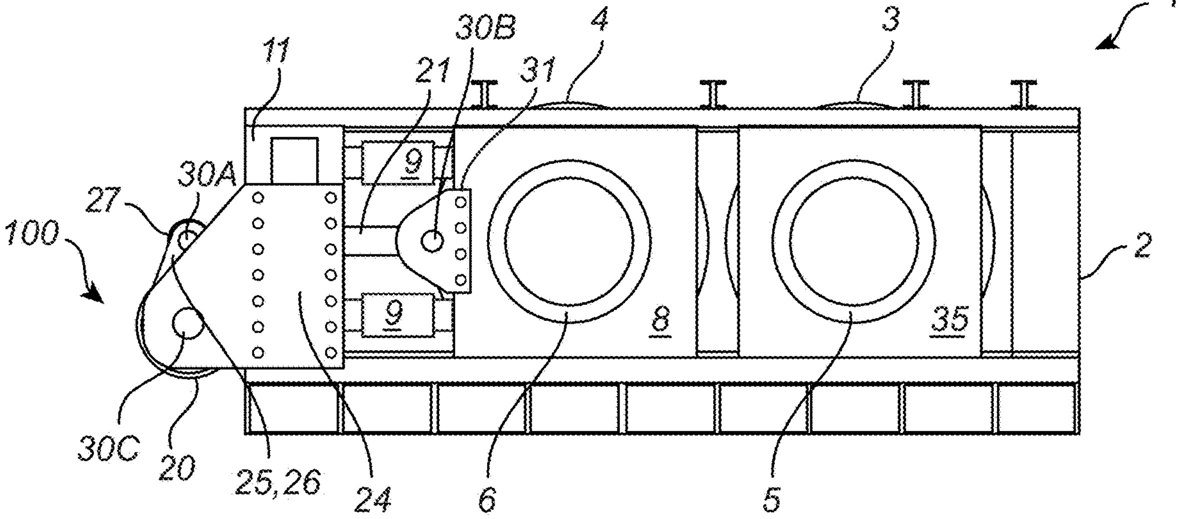
FIG. 2 shows a side view of the roller crusher of FIG. 1.

FIGS. 1 and 2 illustrate a roller crusher 1 comprising a deflection distributor 100, which will be described in more detail later. The roller crusher 1 comprises a frame 2 in which a first, fixed crusher roll 3 is arranged in bearings 5, 5'. The bearing housings 35, 35' of these bearings 5, 5' are fixedly attached to the frame 2 and are thus immoveable. A second crusher roll 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rolls 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. The roller crusher 1 further comprises an active hydraulic system 10, 10' which includes a number of hydraulic cylinders 9, 9'. These hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as they are adjusting the gap width and reacting to forces occurring at the crusher rolls 3, 4 due to material fed to the roller crusher 1. Such roller crushers work according to the earlier disclosed crushing technique called interparticle crushing, and the gap between the crushing rolls 3, 4 is adjusted by the interaction of feed load and the hydraulic system effecting the position of the second crusher roll 4. As stated above, prior art roller crusher of this kind suffers from delay in adjusting the position of the second crusher roll 4. In case of uneven load along the length of the crushing gap or in case of tramp material entering into the crushing gap, especially when entering into the gap off-center, the second crushing roll 4 may skew and the hydraulic system 10, 10' is too slow to adjust the position of the movable bearing housings keeping a constant feed pressure, and the movable bearing housings may jam in the guides 7, 7' and, in case of non-crushable material, the surface of the crushing rolls may be damaged by the non-crushable material, and the whole frame 2 of the roller crusher 1 may become oblique.

The roller crusher 1 further comprises a deflection distributor 100. The deflection distributor 100 comprises a deflection distributing shaft 20 and levers 25, 25' attached at respective ends of the deflection distributing shaft 20. Further, arranged at each end of the deflection distributing shaft 20 is a mount 24, 24' which is used to mount the deflection distributing shaft 20 of the deflection distributor 100 to the frame 2 of the roller crusher 1. The deflection distributing shaft 20 comprises rotational bearings, preferably spherical bearings, in each end thereof allowing the deflection distributing shaft 20 to rotate in relation to the mounts 24, 24' at positions 30C and 30C' respectively. The levers 25, 25' each comprise a shank 26, 26' which are attached with a first end thereof to the deflection distributing shaft 20 and which extends in a radial or tangential direction of the deflection distributing shaft 20. Attached to a second end of each of the levers 26, 26' is a first end 27, 27' of a thrust rod 21, 21'.

Second ends 28, 28' of the thrust rods are attached to the moveable bearing housings 8, 8' of the roller crusher 1. As can be seen in FIGS. 1 and 2, the thrust rods 21, 21' are attached to a respective pin 30A-B, 30A'-B' via a respective bearing (not shown). In the example embodiment, the second ends 28, 28' of the thrust rods are attached to the moveable bearing housings 8, 8' by means of pivot brackets 31, 31'. Each of the levers 25, 25' is attached to a first end 27, 27' of a respective thrust rod 21, 21' such that a longitudinal axis of the lever 25, 25' is arranged substantially perpendicular to a longitudinal axis of the thrust rod 21, 21'. Further, the longitudinal axis of the lever 25, 25' passes through the central axis of the deflection distributing shaft 20 and a pivotal point of the lever 25, 25' and the thrust rod 21, 21'.

Figure 3B:
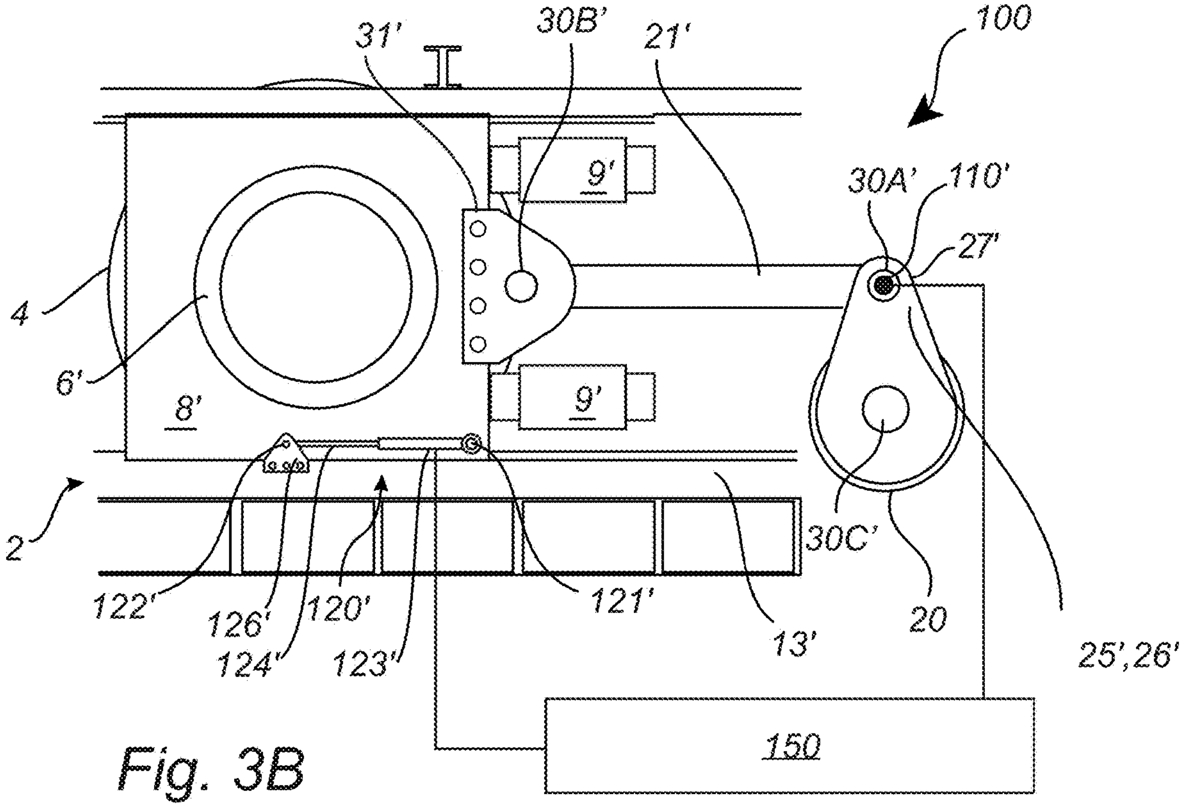

The roller crusher 1 further comprises a set of sensors, which will be discussed in detail below. To increase clarity, said sensors have not been illustrated in FIGS. 1 and 2. Instead, these will be described with reference to FIG. 3A-B, which illustrates the roller crusher 1 in a respective side view, and where some elements have been removed for increased clarity.

The roller crusher 1 further comprises at least one load sensor 110A-B configured to detect material load in the deflection distributor 100. In the example embodiment illustrated in FIGS. 3A-B, the at least one load sensor comprises two load sensors 110A and 110B, each arranged at a respective joint between a first end 27, 27' of each of said thrust rods 21, 21' and a respective lever 25, 25' of the deflection distributing shaft 20. In the example embodiments, the load sensors 110A, 110B are provided as load sensor pins 30A, 30B which would replace the ordinary pins used in these joints. In other embodiments, load sensors 110A, 110B may be arranged inside ordinary pins. This way, they are able to detect the load subjected on each pin by the deflection distribution shaft 20 and the bracket 31, 31' respectively. The load sensor pins may comprise a load cell or force transducer. Such load cells may include, but are not limited to, hydraulic, pneumatic, piezoelectric and strain gauge load cells.

The roller crusher 1 further comprises at least one positioning sensor 120, 120' configured to detect a distance between a first point 121, 121' and a second point 122, 122' of the roller crusher 1. For the example embodiment illustrated in FIGS. 3A and B, the at least one positioning sensor comprises a first 120 and a second 120' positioning sensor arranged on opposite ends of the second crusher roll 4. Each of the first and second positioning sensor 120, 120' has its respective first point 121, 121' defined on a respective movable bearing housing 8, 8', and its respective second point 122, 122' defined on the frame 2. For the example embodiment illustrated in FIGS. 3A and B, the second point 122, 122' is defined on support brackets 126, 126' which are attached to the lower longitudinal frame elements 11, 11' and thus form a part of the frame 2. The positioning sensors 120, 120' of the example embodiment are linear positioning sensors of rod-based design. Each positioning sensor 120, 120' includes a sensor housing 123, 123' in which a sensor rod 124, 124' is slidably arranged. The sensor outputs a signal which depends on the relative position between the sensor rod 124, 124' and the sensor housing 123, 123'. The working principle may be based a linear transducer converting an objects linear motion into electrical signals.

As realized by the person skilled in the art, this arrangement allows for determining the positions of the end points defined by the entire mechanical linkage which makes up the deflection distributor 100. Determining the positions of said end points in relation to each other allows for determining, or estimating, the overall, or total, joint clearance of the deflection distributor 100. Joint clearance is a kind of mechanical hysteresis which occurs in all real mechanically linked systems, and it typically increases with mechanical wear.

For at least this purpose, the roller crusher 1 further comprises a control unit 150 configured to determine, based at least on input from the at least one positioning sensor 120, 120', a degree of joint clearance in the deflection distributor 100 indicative of material wear. The control unit 150 is further configured to determine, based on input from the at least one load sensor 110, 110' and the at least one positioning sensor 120, 120', a degree of rigidity in the deflection distributor 100 indicative of material fatigue. The control unit 150 is operatively connected to the at least one load sensor 110, 110' and to the at least one positioning sensor 120, 120'.

The control unit may include a control circuit and an associated processor, such as a central processing unit (CPU), microcontroller, or microprocessor. The processor being configured to execute program code stored in a memory, in order to carry out functions and operations of the roller crusher 1. Functions and operations of the control unit may be embodied in the form of executable logic routines (e.g., lines of code, software programs, etc.) that are stored on a non-transitory computer readable medium (e.g., the memory) of the control unit and are executed by the control circuit (e.g., using the processor). Furthermore, the functions and operations of the control unit may be a stand-alone software application or form a part of a software application that carries out additional tasks related to the control unit.

A method for monitoring the physical condition of a deflection distributor of a roller crusher will now be described in detail with reference to FIGS. 4A-E, FIGS. 5 and 7. The description will be based on the example embodiment of the roller crusher described with reference to FIGS. 1-3, but the method may be equally applicable to other embodiments of the roller crusher within the scope of the appended claims. Whereas FIGS. 4A-E illustrates the roller crusher 1 schematically from a top view, FIGS. 5 and 6 are graphic representations of the described parameters and the data analysis thereof. FIG. 7 is a flow chart of the method.

Figure 4A:
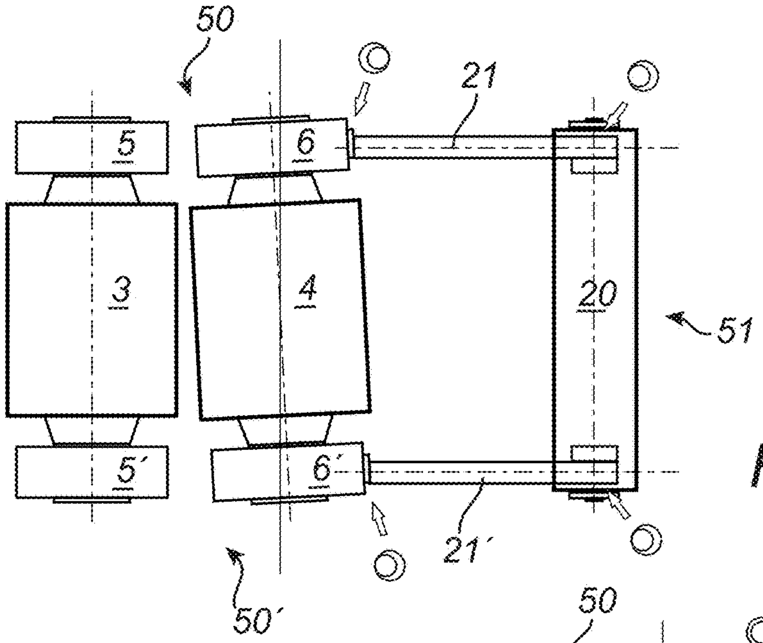
Figure 4B:
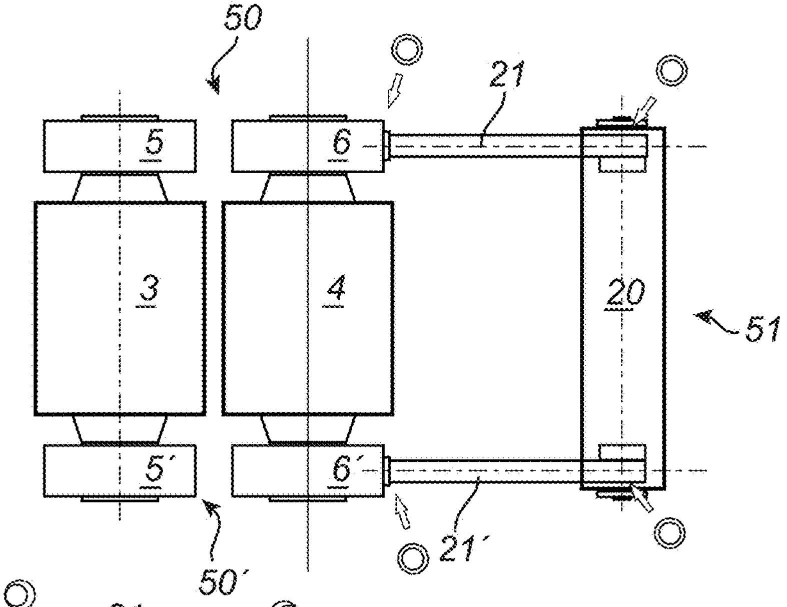
Figure 4C:
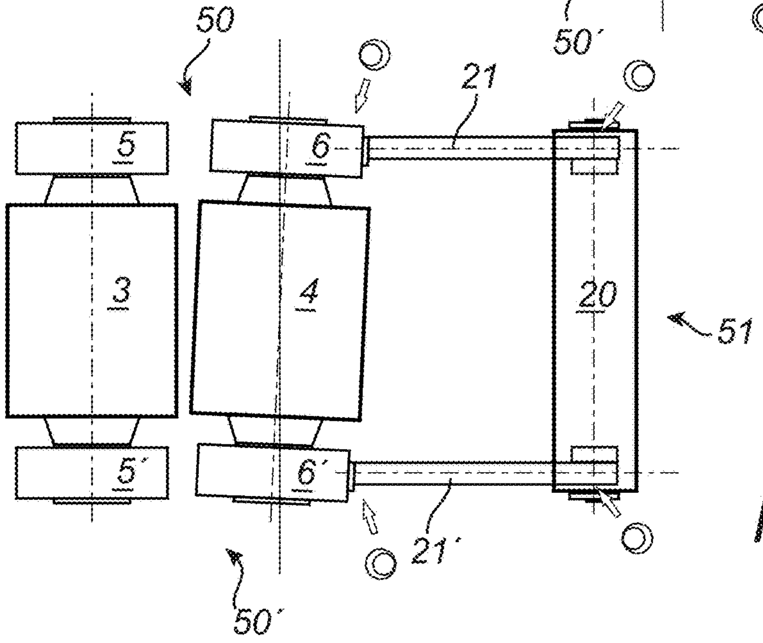

The method comprises displacing S101 the movable bearing housings 8, 8' with respect to each other such that the deflection distributor 100 is moved from a first identified rigid state S1 at which joint clearance does not affect the deflection distributor 100, via an intermediate state S0 at which joint clearance affect the deflection distributor 100, to a second identified rigid state S2 at which joint clearance does not affect the deflection distributor 100. This displacement step S101 is illustrated in FIGS. 4A-C, which illustrate, from a top view, the position of the deflection distributor 100, the movable bearing housings 8, 8', and the second roller 4 for the three states, respectively. The roller crusher 1, as illustrated in FIGS. 1A-C, has a certain amount of joint clearance, as do all real mechanical linkages. This is schematically illustrated in the figures for selected joints by a set of circles, one of the circles being larger than the other circle and enclosing the same. The larger circle symbolizes a position of an opening in a first element, and the smaller circle symbolizes a position of a pin of an adjacent second element, linked to the first element by said pin engaging the first element via the opening (typically the pin will engage the opening via a bearing, but these have been left out for clarity). Starting at one of the movable bearing houses, there are altogether 6 joints which could potentially give rise to joint clearance. These are the joints located where the thrust rods 21, 21' are connected to the deflection distributor 100 (i.e. at the respective location of pins 30A and 30A'), where the thrust rods 21, 21' are connected to a respective movable bearing house (i.e. at the respective location of pins 30B and 30B') and where the deflection distributor shaft 20 is mounted to the frame via mounts 24, 24' (i.e. at the positions 30C and 30 C', respectively, not illustrated in FIGS. 4A-C).

FIG. 4A illustrates the roller press 1 when the movable bearing houses 8, 8' are located with respect to each other such that joint clearance does not affect the deflection distributor 100. This occurs at a state at which the elements defining the mechanical linkage is positioned with respect to each other such that each element abuts adjacent elements rigidly. This is termed herein a rigid state. FIG. 4A illustrates a first rigid state S1 which marks an end state outside of which it is not possible to force the deflection distributor without subjecting it to a load high enough to deform the mechanical parts. As can be seen in FIG. 4A, the second roller 4 is, as a result from total joint clearance, slightly skewed in relation to its intended axis of rotation.

During displacement of the movable bearing housings 8, 8' with respect to each other, the deflection distributor 100 as well as the second roller 4 will move therewith into an intermediate state S0 which is illustrated in FIG. 4B. At the intermediate state S0, joint clearance between the mechanical elements will affect the deflection distributor 100. As can be seen in FIG. 4A, the second roller 4 is, at the intermediate state S0, parallel with the first roller 3 and consequently aligned along its intended axis of rotation.

Continuing the displacement of the movable bearing housings 8, 8' with respect to each other will eventually lead to the deflection distributor 100 reaching a state at which no further displacement is possible without subjecting the deflection distributor 100 to a load high enough to initiate deformation of its mechanical parts. This state is termed the second rigid state S2 and is illustrated in FIG. 4C. As realized by the person skilled in the art, the first S1 and second S2 rigid states are defined in the same way and marks the respective end points of the displacement performed in the method.

The method further comprises determining S102, based on output from the at least one positioning sensor 120, 120' obtained at the first S1 and the second S2 rigid states, respectively, a displacement distance D0 indicative of a degree of joint clearance in the deflection distributor 100. For the example embodiment of FIGS. 3A-B and 4A-E, the displacement distance D0 will reflect the overall, or total, clearance in the deflection distributor 100, because of how the first 120 and second 120' positioning sensor are arranged on the crusher 1 in this embodiment.

The displacement distance D0 could be determined in different ways. As an example, the displacement of movable bearing housing 8 may first be determined by calculating the difference between the value of the distance between the first point 121 and a second point 122 determined at the first rigid state S1 and the second rigid state S2 respectively. Similarly, the displacement of movable bearing housing 8' may be determined by calculating the difference between the value of the distance between the first point 121' and a second point 122' determined at the first rigid state S1 and the second rigid state S2 respectively. Finally, the displacement distance D0 may be determined by the sum of the determined displacements of the movable bearing housings 8, 8'.

The method is however not limited to determining a total displacement distance indicating a total joint clearance. The displacement distance may alternatively be defined over one or a group of joints and hence reflect the joint clearance in said one joint or said group of joints. In such a case, a positioning sensor may be arranged to measure between points on either side of said joint or group of joints.

The first S1 and second S2 rigid states of the deflection distributor 100 may advantageously be identified based on output from the at least one load sensor 110, 110'. The first S1 and/or the second S2 states of the deflection distributor 100 could be identified by detecting a load using the at least one load sensor 110, 110', comparing the detected load to a load threshold value L0, and identify the first S1 and/or the second S2 rigid state at the state of the deflection distributor 100 at which the determined load is found to exceed a load threshold value L0. This is illustrated most clearly in FIG. 5.

Figure 4D:
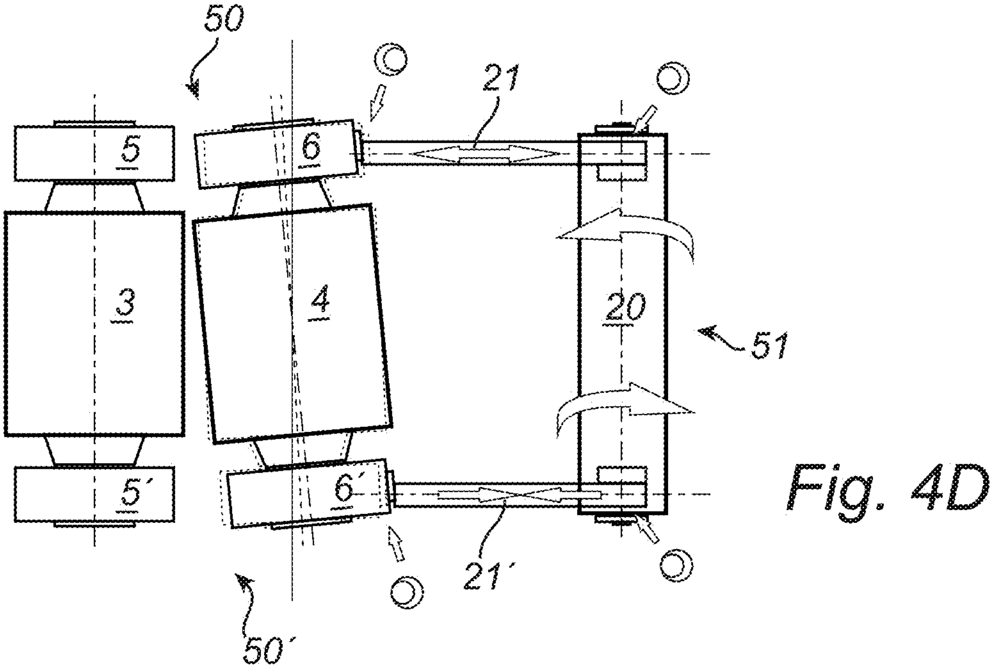

As illustrated in FIG. 4D and FIG. 5, the method further comprises S103 displacing, by applying an external load to the deflection distributor 100, the movable bearing housings 8, 8' with respect to each other such that the deflection distributor is moved to a third rigid state S3 being outside of a range defined between the first S1 and the second S2 rigid states. Applying an external load allows for testing the rigidity, or structural integrity, of the deflection distributor 100. As the material will provide a counter-force which increases with increasing external load, the appearance of the curve of a load-distance diagram will show an increasing function, as illustrated in FIG. 5.

The method further comprises determining S104, based on output from the at least one load sensor 110, 110', a load L1 in the deflection distributor 100 and, based on output from the at least one positioning sensor 120, 120', a further displacement distance D1, wherein said determined load L1 and said determined further displacement distance D1 together defines a determined load-distance pair (L1, D1) which is indicative of a degree of rigidity in the deflection distributor 100. This method step is illustrated most clearly in FIG. 5. The determined load-distance pair (L1, D1) will depend on the rigidity of the deflection distributor 100. A simple approach to estimate a degree of rigidity from the determined load-distance pair (L1, D1) is to form a ratio R between the determined load L1 and the determined further displacement distance D1, said ratio R presenting a decrease with decreasing rigidity.

The method further comprises comparing S105 said displacement distance D0 with a predetermined displacement distance threshold value DT0, and outputting S106 a joint clearance alert signal in response to said displacement distance D0 exceeding said displacement distance threshold value DT0.

The method further comprises comparing S110 a ratio R between said determined load L1 and said determined further displacement distance D1 with a reference ratio R0, and outputting S111 a rigidity alert signal in response to said ratio R deviating from the reference ratio R0 by more than a threshold ratio value RT.

FIG. 8 illustrates an alternative embodiment of the method. The alternative embodiment of the method has method steps S101-S106 in common with the first embodiment. Therefore, these steps are not illustrated again in FIG. 8.

The alternative embodiment of the method comprises varying S207 the applied external load to the deflection distributor 100 such that the deflection distributor 100 is moved between the third S3 rigid state and the second S2 rigid state; repeating S208 the step of determining a load-distance pair for one or more mutually different detected loads L2, L3 so as to provide two or more unique load-distance pairs (L1, D1); (L2, D2); (L3, D3), and determining S209 a load-distance function F based on the coordinates defined by the two or more unique load-distance pairs (L1, D1); (L2, D2); (L3, D3), wherein the load-distance function F is Indicative of a degree of rigidity in the deflection distributor 100. These method steps are most clearly illustrated in FIG. 6.

This embodiment of the method further comprises comparing S210 said determined load-distance function F with a reference function F0; and outputting S211 a rigidity alert signal in response to a slope S of said determined load-distance function F deviating from a slope D0 of said reference function F0 by more than a predetermined slope threshold value ST. Steps S210 and S211 for the second embodiment of the method corresponds to steps S110 and S111 for the first embodiment.

Figure 4E:
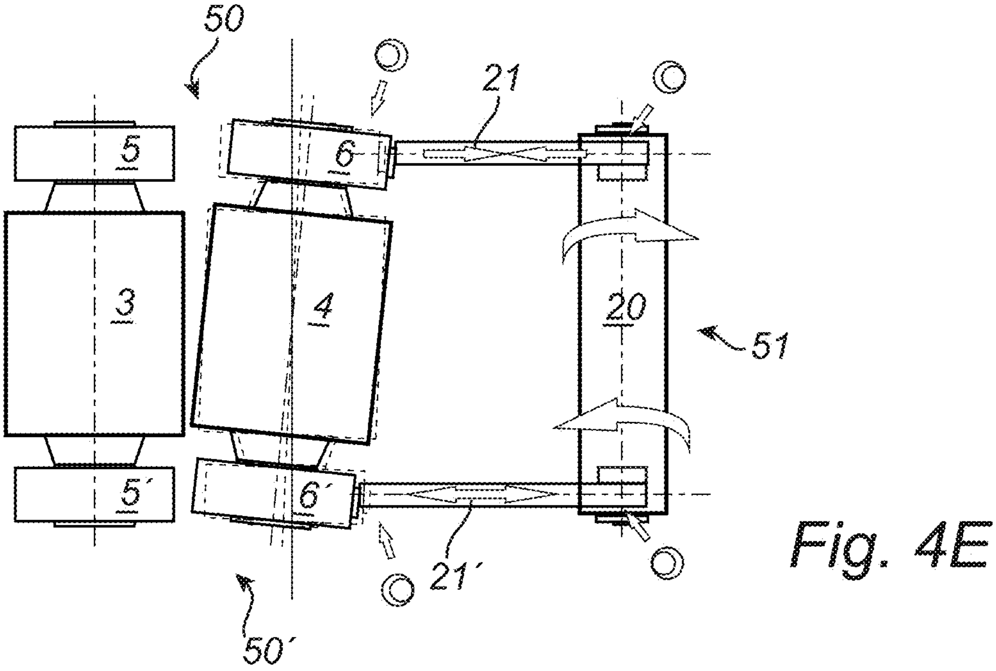

FIGS. 5 and 6 further illustrates a fourth rigid state S4 located on the opposite side of the range defined between the first S1 and second S2 rigid states. The person skilled in the art realizes that the fourth rigid state S4 is the mirrored counterpart of the third rigid state S3 and is a result from symmetry. FIG. 4E illustrates the deflection distributor 100 in the fourth rigid state S4. As indicated in FIG. 6, it is equally possible to apply the method in the range defined between the first S1 and the fourth S4 rigid states as an alternative to applying the method within the range defined between the second S2 and third S3 rigid state. It is also conceivable that the method is applied in both these ranges.

The person skilled in the art realizes that the two embodiments are based on the same general idea, the difference merely being the second embodiment of the method utilizing more measurement points. The two embodiments may thus have different advantages. The first embodiment only requires a single measurement point and may therefore provide results faster, whereas the second embodiment derives an average over many data points and may therefore be expected to provide a higher accuracy in its predictions.

A deflection distributor refitting kit 100' for a roller crusher will now be described with reference to FIG. 9. The deflection distributor refitting kit 100' shares features in common with the deflection distributor 100 of the roller crusher 1 already described in detail hereinabove, why this description can be kept brief.

The deflection distributor refitting kit 100' comprises a deflection distributing shaft 20, thrust rods 21, 21' each having first 27, 27' and second 28, 28' ends and mounts 24, 24' for attachment of said deflection distributing shaft 20 at a first 50 and a second 50' side of a frame of said roller crusher, wherein a first end 27, 27' of each of said thrust rods 21, 21' is attached to said deflection distributing shaft 20 via a lever 26, 26', and wherein a second end 28, 28' of each of said thrust rods 20 is arranged to be attached to a movable bearing housing of said roller crusher. The deflection distributor refitting kit 100' further comprises at least one load sensor 110, 110' configured to detect material load in the deflection distributor refitting kit 100'; and at least one positioning sensor 120, 120' configured to detect a parameter pertaining to a distance between a first point 121, 121' and a second point 122, 122', wherein at least the first point 121, 121' is defined on the deflection distributor refitting kit 100' or on one of the movable bearing housings. The at least one positioning sensor 120, 120' comprises a first positioning sensor 120 configured to be mounted on the first side 50 of the frame and a second positioning sensor 120' configured to be mounted on the second side 50' of the frame such that each of the first and second positioning sensors has its respective first point 121, 121' defined on a respective movable bearing housing, and its respective second point 122, 122' defined on the frame. The at least one load sensor 121, 121' comprises two load sensors each arranged at a respective joint between a first end 27, 27' of each of said thrust rods 21, 21' and a respective lever 26, 26' of the deflection distributing shaft 20.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

What is claimed:

1. A deflection distributor refitting kit for a roller crusher including a frame and movable bearing housings that support a movable roller on the frame, the deflection distributor refitting kit comprising:

a deflection distributing shaft;

thrust rods each having first and second ends and mounts for attachment of said deflection distributing shaft at a first side and a second side of the frame of the roller crusher, wherein a first end of each of the thrust rods is attached to the deflection distributing shaft via a lever, and wherein a second end of each of the thrust rods is configured to be attached to one of the movable bearing housings of the roller crusher, wherein the deflection distributor refitting kit further comprises:

at least one load sensor configured to detect material load in the deflection distributor refitting kit; and at least one positioning sensor configured, when mounted on the roller crusher, to detect a parameter pertaining to a distance between a first point and a second point of the roller crusher wherein at least the first point is defined on the deflection distributor refitting kit or on one of the movable bearing housings.

2. The deflection distributor refitting kit according to claim 1, wherein the at least one positioning sensor comprises a first positioning sensor configured to be mounted on the first side of the frame and a second positioning sensor configured to be mounted on the second side of the frame such that each of the first and second positioning sensors has its respective first point defined on a respective movable bearing housing, and its respective second point defined on the frame.

3. The deflection distributor refitting kit according to claim 1, wherein the at least one load sensor comprises two load sensors each arranged at a respective joint between a first end of each of said thrust rods and a respective lever of the deflection distributing shaft.

4. The deflection distributor refitting kit according to claim 1, wherein the at least one load sensor comprises a plurality of load sensors and the at least one positioning sensor comprises a plurality of positioning sensors.

5. The deflection distributor refitting kit according to claim 1, further comprising a control unit configured to determine, based at least on input from the at least one positioning sensor, a degree of joint clearance in the deflection distributor refitting kit indicative of material wear.

6. The deflection distributor refitting kit according to claim 5, wherein the control unit is further configured to determine, based on input from the at least one load sensor and the at least one positioning sensor, a degree of rigidity in the deflection distributor refitting kit indicative of material fatigue.

7. The deflection distributor refitting kit according to claim 1, wherein at least one of the at least one load sensor is a load sensor pin.

8. The deflection distributor refitting kit according to claim 1, wherein at least one of the at least one positioning sensor is a linear positioning sensor.

9. The deflection distributor refitting kit according to claim 1, wherein at least one of the at least one load sensor and at least one of the at least one positioning sensor are arranged on the deflection distributing shaft and configured to detect a torsional load and an angle of twist, respectively.

10. The deflection distributor refitting kit according to claim 1, wherein at least one of the at least one load sensor and at least one of the at least one positioning sensor are arranged on each of the thrust rods and configured to detect an axial load and a linear distance, respectively.

11. The deflection distributor refitting kit according to claim 1, wherein at least one of the at least one positioning sensor is arranged on the deflection distributor refitting kit such that its first point is defined on the deflection distributing shaft and its second point is defined on one of the thrust rods.

* * * * *